United States Patent
Guan et al.

(10) Patent No.: US 12,512,984 B2
(45) Date of Patent: Dec. 30, 2025

(54) CRYPTOGRAPHIC DATA MESSAGE EXPANSION FOR INCREASING ADVERSARIAL STORAGE REQUIREMENTS

(71) Applicant: NTT Research, Inc., Sunnyvale, CA (US)

(72) Inventors: Jiaxin Guan, New York, NY (US); Daniel Wichs, Boston, MA (US); Mark Zhandry, New York, NY (US)

(73) Assignees: NTT Research, Inc., Sunnyvale, CA (US); The Trustees of Princeton University, Princeton, NJ (US)

( * ) Notice: Subject to any disclaimer, the term of this patent is extended or adjusted under 35 U.S.C. 154(b) by 45 days.

(21) Appl. No.: 18/708,201

(22) PCT Filed: Nov. 4, 2022

(86) PCT No.: PCT/US2022/049033
§ 371 (c)(1),
(2) Date: May 7, 2024

(87) PCT Pub. No.: WO2023/081407
PCT Pub. Date: May 11, 2023

(65) Prior Publication Data
US 2024/0430084 A1    Dec. 26, 2024

Related U.S. Application Data

(60) Provisional application No. 63/276,659, filed on Nov. 7, 2021.

(51) Int. Cl.
*H04L 9/14* (2006.01)

(52) U.S. Cl.
CPC .................................. *H04L 9/14* (2013.01)

(58) Field of Classification Search
CPC ......... H04L 9/14; H04L 9/3247; H04L 9/065; G06F 21/602; G06F 21/64
See application file for complete search history.

(56) References Cited

U.S. PATENT DOCUMENTS

| | | | |
|---|---|---|---|
| 2014/0229739 A1* | 8/2014 | Roth | G06F 21/6218 713/189 |
| 2014/0355754 A1* | 12/2014 | Leung | H04L 9/065 380/28 |
| 2021/0049283 A1* | 2/2021 | Chen | H04L 63/0478 |
| 2022/0250998 A1* | 8/2022 | Doutreluingne | A01G 31/00 |

* cited by examiner

*Primary Examiner* — Abiy Getachew
(74) *Attorney, Agent, or Firm* — CipherLaw

(57) ABSTRACT

The disclosure relates to generating a ciphertext of arbitrary and flexibly large size and ensures that an adversary learns little about the encrypted data, even if the decryption key later leaks, unless substantially the entire ciphertext is stored. Given that communication will be inconveniently large for the adversary to store, the incompressible ciphertexts and signatures can be sent and received with low storage requirements for the honest users. In such a setting, the honest users would not store the entire ciphertext or signature, but instead generate, send, and process the communication bit-by-bit in a streaming fashion.

19 Claims, 4 Drawing Sheets

CRYPTOGRAPHIC DATA MESSAGE EXPANSION FOR INCREASING ADVERSARIAL STORAGE REQUIREMENTS

CROSS-REFERENCE TO RELATED APPLICATIONS

This application is a national stage application, filed under 35 U.S.C. § 371, of International Patent Application No. PCT/US2022/049033, filed Nov. 4, 2022, which claims the benefit of U.S. Provisional Application No. 63/276,659, filed Nov. 7, 2021, the contents of both of which are hereby incorporated in their entireties.

STATEMENT OF GOVERNMENT SUPPORT

This invention was made with government support under National Science Foundation Award No. 1749731 awarded by National Science Foundation. The government has certain rights in the invention.

FIELD OF THE INVENTION

The disclosure relates to generating a ciphertext of arbitrary and flexibly large size and ensures that an adversary learns less about the encrypted data, even if the decryption key later leaks, unless substantially the entire ciphertext is stored.

BACKGROUND OF THE INVENTION

Security breaches are ubiquitous. Therefore, it is natural to wonder: will encrypted messages remain secure, even if the secret decryption key is later leaked? Forward secrecy deals exactly with this problem, but requires either multi-round protocols or key updates, both of which may be undesirable in many scenarios. And in the usual time-bounded adversary model, unfortunately, such limitations are inherent: an adversary can simply store the ciphertext and wait for the secret key to leak, at which point it can easily decrypt.

Incompressible encryption allows us to make the ciphertext size flexibly large and ensures that an adversary learns nothing about the encrypted data, even if the decryption key later leaks, unless the adversary stores essentially the entire ciphertext. Incompressible signatures can be made arbitrarily large and ensure that an adversary cannot produce a signature on any message, even one the adversary has seen signed before, unless the adversary stores one of the signatures essentially in its entirety.

Incompressible encryption. Disclosed herein are techniques to force a would-be "save-it-for-later adversary" to actually store the ciphertext in its entirety, for the entire length of time it is waiting for the secret key to leak. At a minimum such storage may be inconvenient, and for very large files or long time frames, it may be prohibitively costly. Even for short messages, one may artificially increase the ciphertext size, hopefully forcing the adversary to use much more storage than message length. We may therefore hope that such an incompressible encryption scheme maintains the privacy of messages even if the secret key is later revealed.

For an illustrative example, an individual with a gigabit internet connection can transmit ~10 TB per day, potentially much more than their own storage. Of course many entities will have 10 TB or even vastly more, but an incompressible scheme would force them to devote 10 TB to storing a particular ciphertext for potentially years until the key is revealed. Across millions or billions of people, even powerful adversaries like state actors would only be able to devote such storage to a small fraction of victims.

Unfortunately, traditional public key encryption schemes are not incompressible; an adversary may be able to store only a short digest of the ciphertext and still obtain non-trivial information about the plaintext once the secret key is leaked. For example, for efficiency reasons, hybrid encryption is typically used in the public key setting, where the encryption of a message m may look like:

$$(Enc(pk, s), G(s) \oplus m).$$

Here, s is a short seed, and G is a pseudorandom generator used to stretch the random seed into a pseudorandom pad for the message m. A save-it-for-later adversary need not store the entire ciphertext; instead, they can store just Enc(pk, s) as well as, for example, the first few bits of $G(s) \oplus m$. Once the secret key is revealed, they can learn s and then recover the first few bits of m. This may already be enough to compromise the secrecy of m. Such an attack is especially problematic if we wanted to artificially increase the ciphertext size by simply padding the message and appending dummy bits, since then the first few bits of m would contain the entire secret plaintext.

The compressibility issue is not limited to the scheme above: we could replace $G(s) \oplus m$ with a different efficient symmetric key encryption scheme such as CBC-mode encryption, and essentially the same attack would work. The same goes for bit encryption as well.

Incompressible public key encryption instead requires that if the adversary stores anything much smaller than the ciphertext, the adversary learns absolutely nothing about the message, even if the secret key later leaks.

It is noted that that plain public key encryption does have some incompressibility properties. In particular, it is impossible, in a plain public key encryption scheme, for the adversary to significantly compress the ciphertext and later be able to reconstruct the original ciphertext. However, this guarantee implies nothing about the privacy of the underlying message should the key leak.

Incompressible Signatures. A canonical application of signatures is to prevent man-in-the-middle attacks: by authenticating each message with a signature, one is assured that the messages were not tampered with. However, a man-in-the-middle can always delay sending an authenticated message, by storing it for later. The only way to block such attacks in the usual time-bounded adversary model is to use multi-round protocols, rely on synchronized clocks and timeouts, or have the recipients keep state, all of which may be undesirable. Also addressed herein is the case of incompressible signatures, which force such a delaying adversary to actually store the entire signature for the duration of the delay.

In the case of plain signatures, a forgery is a signature on any new message, one the adversary did not previously see signed. The reason only new signed messages are considered forgeries is because an adversary can simply store a valid signature it sees, and later reproduce it. An incompressible signature, essentially, requires that an adversary who produces a valid signature on an existing message must have actually stored a string almost as large as the signature. By making the signatures long, we may hope to make it prohibitively costly to maintain such storage. As in the case of encryption, existing signature schemes do not appear to offer incompressible security; indeed, it is usually desired that signatures are very short.

Feature: Low-storage for streaming honest users. Given that communication will be inconveniently large for the adversary to store, a desirable feature of incompressible ciphertexts and signatures is that they can be sent and received with low storage requirements for the honest users. In such a setting, the honest users would never store the entire ciphertext or signature, but instead generate, send, and process the communication bit-by-bit in a streaming fashion.

Feature: High rate. With incompressible ciphertexts and signatures, communication is set to be deliberately large. If the messages themselves are also large, it may be costly to further blow up the communication in order to achieve incompressibility. Therefore, a desirable feature is to have the rate—the ratio of the maximum message length to the communication size—be as close to 1 as possible. In this way, for very large messages, there is little communication overhead to make the communication incompressible.

Prior work constructed information-theoretically secure symmetric-key incompressible encryption (referred to as forward-secure encryption) via randomness extractors. The focus herein is on public-key encryption and signature schemes, which inherently cannot be information-theoretically secure. The symmetric-key scheme of prior work also only offers one-time security. However, a simple hybrid argument shows that this implies many-time security, where the adversary can compress each of many ciphertexts separately and later sees the secret key. However, it inherently does not offer any security if the adversary can jointly compress many ciphertexts, even if the compressed value is much smaller than a single ciphertext. In contrast, public-key incompressible encryption automatically ensures security in such setting via a simple hybrid argument.

Other work defines and constructs what is called disappearing public key encryption and digital signatures. Those notions have an important distinction: they assume both honest and malicious parties operate as space-bounded streaming algorithms throughout their operation. Honest users are assumed to have a somewhat lower storage bound than the adversary's.

In terms of the functionality requirement for honest users, the model of other work corresponds to the low-storage streaming variant of incompressible cryptography. However, in terms of the security requirement, disappearing cryptography is somewhat weaker, since it restricts the adversary to also be space-bounded throughout its entire operation, and observe the ciphertexts/signatures produced by the cryptosystem in a streaming manner. On the other hand, incompressible cryptography allows the adversary to observe each ciphertext/signature in its entirety and compute on it using an unrestricted amount of local memory, but then store some small compressed version of it afterwards. Some disappearing schemes may be insecure in the incompressible threat model: for example, a known disappearing ciphertext scheme could potentially even be based on symmetric key cryptography, despite being a public key primitive. It can be appreciated that one-way functions, and therefore symmetric key cryptography, are implied by disappearing ciphertexts, since the secret key can be information-theoretically recovered from the public key. Yet public key incompressible ciphertexts easily imply public key encryption, which is believed to be stronger than symmetric key cryptography.

In summary, incompressible cryptography with low-storage streaming is also disappearing, but the reverse direction does not hold.

Bounded Storage Model. Other work is set in a Bounded Storage Model (BSM), which leverages bounds on the adversary's storage to enable applications. Most prior work in the BSM is about achieving unconditionally secure schemes for the types of scenarios for which we already have computationally secure schemes in the standard model (CPA encryption, Key Agreement, Oblivious Transfer, etc.). Time-stamping is perhaps the first application of the BSM beyond achieving information-theoretic security by assuming additional computational assumptions. This disclosure considers scenarios for which computationally secure schemes in the standard model are impossible and which only make sense in the BSM (public-key encryption where the adversary gets the secret key after seeing the ciphertext, signature schemes where the adversary cannot sign messages whose signatures the adversary has previously observed).

Big-Key Cryptography in the Bounded Retrieval Model. The study of big-key cryptography in the Bounded Retrieval Model (BRM) has evolved through a series of works. The high-level difference is that in the BRM, the secret keys are made large to prevent exfiltration, while the communication (e.g., ciphertexts, signatures) are kept small. Incompressible cryptography is the reverse: we make the communication large to prevent an adversary from being able to remember it in its entirety, while the secret key is ideally small. On a technical level, while there are some high-level similarities such as relying on a combination of computational and information-theoretic techniques, the concrete schemes are quite different.

Symmetric Cryptography with Memory-Bounded Adversaries. There have been various studies into the symmetric-key setting where the adversaries are memory-bounded. All of these prior works are in the symmetric-key setting, and it is not obvious how to extend them to the public-key setting.

Other work explores several interesting applications of disappearing ciphertexts and signatures, including deniable encryption. Here, one imagines that the secret key holder is coerced into revealing their key. In order to protect the contents of an encrypted message, traditional deniable encryption allows the key holder to generate a fake key that causes the ciphertext to decrypt to any desired value. Unfortunately, such receiver-deniable encryption is impossible in the standard model. Disappearing ciphertexts offer a solution, since the contents are protected without even faking the key, as the space-bounded attacker is unable to store the ciphertext.

However, in addition to achieving a weaker security model than incompressible cryptography, the prior work schemes are based on non-standard heuristic assumptions. In particular:

Their schemes are built from a novel object called online obfuscation, a very strong proposed form of program obfuscation in the bounded storage setting. While prior work gives plausible candidate constructions, the constructions are complex and it is unclear how to prove security. It is even plausible that the notion of online obfuscation is impossible.

One of their candidates requires, at a minimum, standard-model virtual grey box (VGB) obfuscation, which is stronger even than indistinguishability obfuscation, already one of the strongest known assumptions in cryptography. And even assuming VGB, the security remains unproven. Their other candidate could plausibly be information-theoretic, but is limited to a quadratic separation between the cipher-text/signature size and the honest users' storage.

Their encryption and signature schemes involve ciphertexts/signatures that are significantly larger than the messages, and so their schemes are low "rate" when the messages are large.

To summarize, prior works did not disclose how to achieve disappearing/incompressible public-key encryption/signatures with provable security even under very strong assumptions such as indistinguishability obfuscation.

BRIEF SUMMARY OF THE INVENTION

Disclosed herein are constructions of both incompressible public-key encryption and signatures under minimal assumptions. Furthermore, large incompressible ciphertexts (respectively, signatures) can be decrypted (respectively, verified) in a streaming manner with low storage. In particular, these notions strengthen the related concepts of disappearing encryption and signatures, wherein the constructions relied on sophisticated techniques and strong, non-standard assumptions. The constructions herein are extended to achieve an optimal "rate", meaning the large ciphertexts (respectively, signatures) can contain almost equally large messages, at the cost of stronger assumptions.

The inventive systems and methods yield positive results for incompressible cryptography:

Under the minimal assumption of standard-model public key encryption, we construct an incompressible public key encryption scheme. The scheme supports streaming with constant storage, independent of the ciphertext size. As a special case, we achieve provably secure disappearing ciphertexts with optimal honest-user storage and under mild assumptions, significantly improving on prior work. The ciphertext size is $|c|=|S|+|m|\times$ poly$(\lambda)$, where $|S|$ is the adversary's storage, $|m|$ the message size, and $\lambda$ the security parameter.

Under the minimal assumption of one-way functions, we construct incompressible signatures. Our scheme supports streaming with constant storage, independent of the signature size. Thus we also achieve provably secure disappearing signatures under minimal assumptions, again significantly improving on prior work. The total communication (message length plus signature size) is $|S|+|m|+$poly$(\lambda)$.

Under standard-model indistinguishability obfuscation (iO), we construct "rate 1" incompressible public-key encryption, where $|c|=|S|+$poly$(\lambda)$ and the message length can be as large as roughly $|S|$. In particular, for very large messages, the ciphertext size is roughly the same as the message size.

The public keys of our scheme are small, but the secret keys in this scheme are at least as large as the message, which is potentially inherent amongst provably-secure high-rate schemes.

Along the way, we give the first rate-1 Construction of functional encryption for circuits, where $|c|=|m|+$poly$(\lambda)$.

We consider a notion of "rate-1" incompressible signatures, where the total communication is only $|S|+$poly$(\lambda)$, and the message can be as large as roughly $|S|$. Note that the signature by itself must have size at least $|S|$ for incompressibility (since m may be compressible), and so if we separately send the message and signature, the total communication would be at least $|S|+|m|$, which is not rate 1. Instead, we just send a signature and require the message to be efficiently extractible from the signature.

We show that rate-1 incompressible signatures are equivalent to incompressible encodings. We obtain such signatures under either the Decisional Composite Residuosity (DCR) or Learning With Errors (LWE) assumption, in either the CRS or random oracle model. The random oracle version supports low-space streaming, as does the CRS model if we assume the (large) CRS is streamed. We also conclude that a provably secure rate-1 construction in the standard model is unlikely.

In various embodiments, a computer-implemented method, computing device, and computer-readable storage media are disclosed. In one example embodiment for message encryption, the computer-implemented method, computing device, and computer-readable storage media can comprise: receiving a message m of arbitrary length and storing the message m on a computerized data store; storing a predetermined target ciphertext length; executing a setup comprising: instantiating a functional encryption scheme to generate a master secret key (msk) and master public key (mpk); generating a random variable v; defining a function fv based on v; deriving a second secret key by executing the key generation algorithm of the functional encryption scheme based on fv and the master secret key, resulting in a derived secret key skv; encrypting the message m by: generating a first random string r having a length based on the predetermined target ciphertext length; generating an at least partially random second string u; encrypting u under the functional encryption scheme to generate ciphertext c; deriving z from r and u and m; and outputting z, r and ciphertext c and storing ciphertext c in the computerized data store.

In further embodiments, u is based on two random strings and has a last bit set to be 0; and the derivation of z from r and u and m is performed by: applying a randomness extractor to r and s, where s is a component of string u; and xoring the results of the randomness extractor with m and t, where t is a part of string u.

In further embodiments, the extractor is configured to operate in a streaming model, wherein the extractor value r is fed to the extractor in a bitwise streaming fashion.

In further embodiments, the generated first random string has a length that closely approximates but is smaller than the length of the specified target ciphertext length.

In further embodiments, defining a function fv based on v further comprises: receiving an input string; based on the last bit of u, if the last bit is 0, then outputting s and t; if the last bit is 1, then outputting (s and t) xor v.

In further embodiments, the functional encryption scheme is instantiated by: receiving a message comprising u and a flag comprising the last bit of u; generating a set of 2*n public-secret key pairs for a public key encryption scheme (pki,b,ski,b) where n is the length of u−1, where b is 0 or 1, and i is in the range of 1 to n; executing a key generation process, comprising: for i in the range of 1 to n, generating secret key (ski,w) where w is the ith bit of v; executing an encryption algorithm, comprising: for i in the range of 1 to n, and b is 0 or 1, if the flag is 0, then compute the public key encryption cti,b of ith bit of u using pki,b; if the flag is 1, then compute the public key encryption cti,b of the ith bit of u xor b using pki,b; and storing the encryptions as the output of the functional encryption scheme.

In one example embodiment for decrypting an encrypted message, the computer-implemented method, computing device, and computer-readable storage media can comprise: processing a derived secret key sky and a ciphertext c by a functional encryption decryption algorithm to derive a string s'; deriving a plaintext message from s', r and z; wherein, the plaintext message was previously encrypted by: generating a first random string r having a length based on a specified target ciphertext length; generating an at least partially random second string u; encrypting u under a functional encryption scheme to generate c; and deriving z from r and u and m; and outputting z, r, and ciphertext c.

Further embodiments comprise executing the decryption method by: for i in the range of 1 to n, executing a public key decryption on the ciphertext cti,w using the ski,w and storing the output as the plaintext message.

Further embodiments comprise deriving plaintext message from s', r and z further comprises: decomposing s' into s and t; and applying a randomness extractor to r and s, and xoring the result with t.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
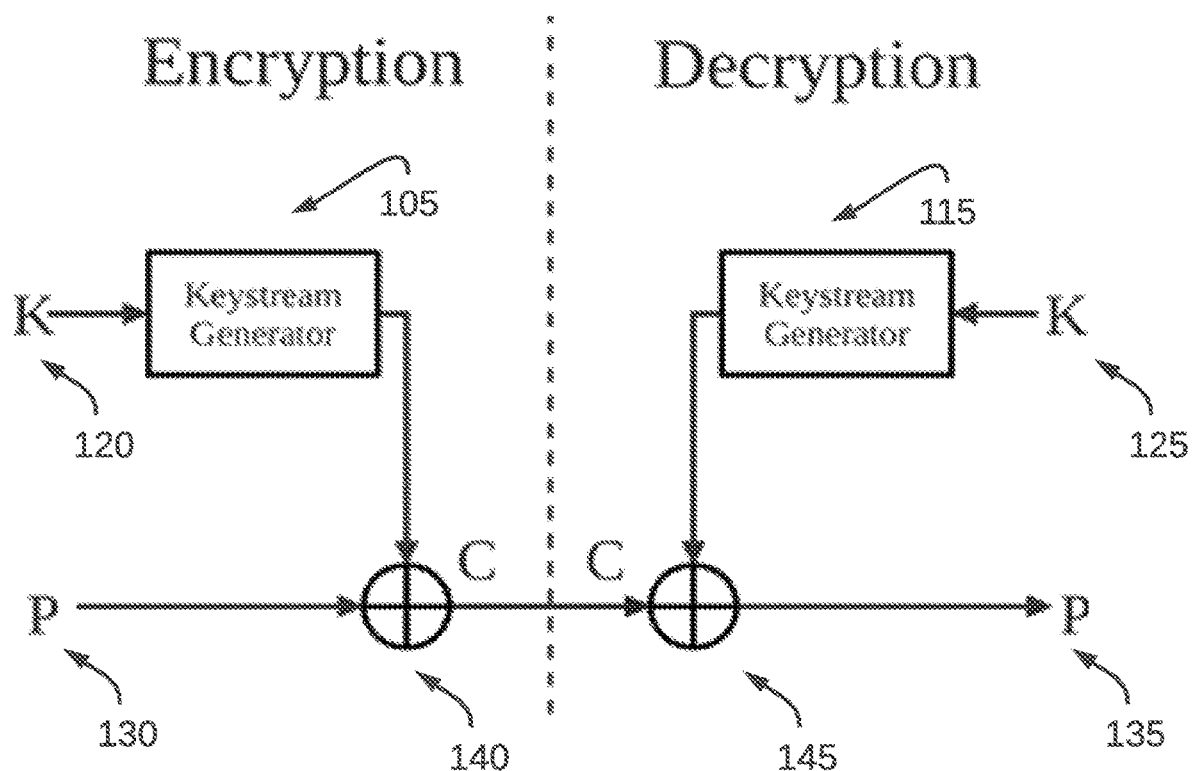
FIG. 1 illustrates an example streaming implementation of the claimed systems and methods.

We first consider incompressible public key encryption. The syntax is identical to that of standard-model encryption, but the security game is different:

1. The challenger first gives the adversary the public key.
2. The adversary then produces two messages $m_0$, $m_1$.
3. The challenger encrypts one of the two messages, as the ciphertext c.
4. Now the adversary produces a state s of size somewhat smaller than c.
5. The challenger then reveals the secret key.
6. The adversary, given only the small state s but also the secret key, now makes a guess for which message was encrypted.

Note that, except for the size of the state s being bounded between Steps 4 and 6, the size of the adversary's storage is unbounded. It can also be seen that this definition implies standard semantic security of public-key encryption.

This security definition is similar to that of a known disappearing public key encryption with two distinctions. Firstly, in the disappearing encryption security experiment, there is no Step 4 as above. Instead, the adversary is bounded by some space throughout the entire experiment. Additionally, functionality wise, disappearing encryption requires the protocol to be executable by honest parties with some space bound lower than the adversary's storage. As disclosed herein, this is not an inherent requirement, but rather a desirable feature that some of the disclosed schemes satisfy. As described herein, this feature is incompatible with rate-1 schemes, and hence will be dropped in that setting.

Disclosed herein is a construction of incompressible encryption, under the minimal assumption of generic public key encryption.

In some embodiments, the disclosed solution is using functional encryption (FE), which is a form of public key encryption where the secret key holder can give out function secret keys for functions f; a function secret key allows for learning f(m) but nothing else about the message. For some disclosed applications, it only needs a very special case of single-key functional encryption, which is instantiated with a practical construction from generic public key encryption scheme. The disclosed incompressible encryption scheme works as follows:

The public key is just the public key for the underlying FE scheme. The secret key is a function secret key for the function $f_v$ defined as $$f_v(s, b) = \begin{cases} s & \text{if } b = 0 \\ s \oplus v & \text{if } b = 1 \end{cases}$$

where the value v is chosen uniformly at random and hard-coded into $f_v$. Here, s, v are reasonably short strings, whose length is addressed below.

To encrypt m, choose a random s, and compute c←FE.Enc(FE.mpk, (s, 0)) as an encryption of (s, 0) under the FE scheme. Then choose a large random string R. Interpret s as the pair (s', t), where t is a string of length equal to the message length, and s' is the seed for a strong extractor. Then compute z=Extract(R; s')⊕t⊕m. The final ciphertext is (c, R, z).

To decrypt, use the FE secret key to recover s=(s', t) from c. Then recover m=z⊕Extract(R; s')⊕t.

We can generate and transmit the string R in a streaming fashion. We can then use an online extractor so that Extract (R; s') can be computed without having to store R in its entirety. Note that R is the only "big" component of the ciphertext, so encryption and decryption therefore require small space.

We prove security through a hybrid argument. First, we use FE security to switch to c being generated as c←FE.Enc (FE.mpk, (s⊕v, 1)). Since this c decrypts equivalently under the secret key, this change is indistinguishable.

We then observe that the string u=s⊕v being encrypted under the FE scheme, as well as the string z included in the final ciphertext, are both just uniformly random strings. We can therefore delay the generation of the secret key and v until the very end of the experiment. Now we think of the adversary's state (as well as some other small values needed to complete the simulation) as a leakage on the large random string R. Since the adversary's storage is required to be small compared to R, R has min-entropy conditioned on this leakage. This means we can invoke the randomness guarantee of the randomness extractor to replace Extract(R; s') with a uniform random string. At this point, m is one-time-padded with a uniform string, and therefore information-theoretically hidden.

How to instantiate the functional encryption scheme is disclosed herein. Since the adversary only ever sees a single secret key, we can build such a functional encryption scheme generically from public key encryption, using garbled circuit techniques. On the other hand, the disclosed functional encryption scheme only needs to support an extremely simple linear function. We show a practical solution from any public key encryption scheme.

We note that the disclosed scheme has a less-than-ideal rate, since the ciphertext size is at least as large as the adversary's storage plus the length of the message. Low rates, however, are inherent to schemes supporting low-storage streaming. Indeed, the storage requirements of the honest users must be at least as large as the message, and in the high-rate case this means the honest users must be capable of storing the entire ciphertext. This remains true even if the message itself is streamed bit-by-bit, which can be seen as follows: by incompressibility, the decrypter cannot start outputting message bits until essentially the entire stream has been sent. Otherwise, an attacker can store a short prefix of the ciphertext, and then when it gets the secret key mimic the decrypter until it outputs the first message bit. Now, at the point right before the decrypter outputs the first message bit, the entire contents of the message must be information-theoretically contained within the remaining communication (which is short) and the decrypter's state, since the decrypter ultimately outputs the whole message. Thus the decrypter's state must be almost as large as the message.

A rate-1 solution. We disclose how we achieve a rate-1 scheme, using indistinguishability obfuscation. A brief overview is presented first with the full construction below.

The central difficulty in achieving a rate-1 scheme is that we cannot guarantee a ciphertext with large information-theoretic entropy. Indeed, the ciphertext must be almost as small as the message, so there is little room for added entropy on top of the message. But the message itself, while large, may not have much entropy. Therefore, the disclosed approach of using randomness extraction to extract a random string from the ciphertext will not work naively.

In some embodiments, the disclosed solution can have the large random value in the secret key. We switch to a hybrid where the ciphertext is just an encryption of large randomness R, and the secret key contains the message, masked by a string extracted from R. Now we can mimic the low-rate case, arguing that given the small state produced by the adversary, R still has min-entropy. Thus, the message m is information-theoretically hidden.

The result is that we achieve an incompressible encryption scheme whose rate matches the rate of the underlying functional encryption scheme. Unlike the low-rate case, the disclosed FE scheme appears to need the full power of FE for circuits, since it will be evaluating cryptographic primitives such as PRGs and extractors. Unfortunately, all existing FE schemes for general circuits, even using iO, have poor rate. For example, if we look at a known iO scheme, the ciphertext contains two plain public key encryption encryptions of the message, plus a NIZK proof of consistency. The result is that the rate is certainly at most ⅓. Another construction sets the ciphertext to be an obfuscated program containing the message; since known obfuscation schemes incur a large blowup, the scheme is not rate-1.

We give a novel rate-1 FE scheme (with many key security). Prior work builds an object called private linear broadcast encryption (PLBE), which can be seen as a special case of FE for simple comparison functionalities. However, their approach readily gener-alizes to more complex functionalities. The problem with their construction is that their proof incurs a security loss proportional to the domain size. In their case, the domain is polynomial and this is not a problem. But as described herein, the domain is the message space, which is exponential. One may hope to use complexity leveraging, but this would require setting the security parameter to be at least as large as the message. However, this will not give a rate-1 scheme since the ciphertext is larger than the message by an additive factor linear in the security parameter.

We therefore devise new techniques for proving security with just a polynomial loss, even for large messages, thus giving the first rate-1 FE scheme for general circuits, from iO and one-way functions.

We note that the final construction of rate-1 incompressible encryption has very short public keys, but large secret keys. Cryptographic assumptions typically make no restrictions on the adversary's storage. The issue is that the message itself may have little entropy, and so to prove that a ciphertext is incompressible it seems the computational assumptions will be used to transition to a hybrid where the ciphertext has nearly full entropy. But this transition happens without space bounds, meaning the reduction actually is capable of decrypting the ciphertext and recovering the message once the key is revealed. Yet in this hybrid the ciphertext was "used up" in order to make it high-entropy, and it seems the only place left to embed the message is the secret key. If the message is large, it therefore seems the secret key must be large as well. This intuition can be formalized as a black-box separation result.

Incompressible Signatures. An incompressible signature scheme is defined by the following experiment:
1. The challenger first gives the adversary the public key.
2. The adversary makes repeated signing queries on arbitrary messages. In response, the challenger produces a signature on the message.
3. After observing many signatures, the adversary must produce a small state s of size somewhat smaller than a single signature.
4. Next, the adversary, is given the small state s, and wins if it produces a valid signature on any message, potentially even one used in a prior signing query.

Note that, except for the size of the state s being bounded between Steps 3 and 4, the size of the adversary's storage is unbounded.

This definition is also quite similar to that of a known disappearing signature except for two differences. For disappearing signatures, the security experiment does not have Step 3 as above, and instead requires the adversary to be bounded by some space throughout the entire experiment. Functionality wise, disappearing signature requires the scheme can be run by honest parties with a space bound somewhat lower that the adversary's storage, whereas we don't require that for incompressible signatures.

A first construction of incompressible signatures is provided below. To sign m, first choose a large uniformly random string R, and then compute $\sigma \leftarrow \text{Sign}(sk, (R, m))$, where Sign is a standard-model signature scheme. The overall signature is then $(R, \sigma)$. Verification is straightforward.

Both signing and verification can be evaluated in a low-space streaming fashion, provided Sign can be evaluated as such. One can always assume this property of Sign: first hash the message using a streaming-friendly hash function such as Merkle-Damgård, and then sign the hash. Since the hash is small and computing the hash requires low-space, the overall signing algorithm is low space.

For security, consider an adversary which produces a small state s somewhat smaller than the length of R. Since R is random, it will be infeasible for the adversary to reproduce R in Step 4. Therefore, any valid signature must have an R different than any of the messages previously signed. But this then violates the standard unforgeability of Sign.

A rate-1 solution. As disclosed herein, we modify the above construction to get a rate-1 solution. We note that "rate" here has to be defined carefully. In the above solution, the signature size is independent of the message size, and so it seems that the signature has good rate. However, communication will involve both the signature and the message, and so the total length of the communication will be significantly larger than the message. We therefore want that the total communication length is only slightly longer than the message being signed.

On the other hand, if the message is very long, one may naturally wonder whether we can just sign the message using any standard-model signature scheme, and have the resulting communication be rate-1. However, a long message may in fact be compressible. What we want is to achieve rate-1 total communication, and incompressibility, even if the message may be compressed.

We therefore define a rate-1 incompressible signature as an incompressible signature where the signature is only slightly longer than the message, and where there is a procedure to extract the message from the signature. In this way, all that needs to be sent is the signature itself, and therefore the total communication remains roughly the same as the message.

Equivalence to incompressible encodings. We next demonstrate that incompressible signatures are equivalent to incompressible encodings. These are public encoding schemes where the encoding encodes a message into a codeword c that is only slightly longer than the message. From c, the original message can be recovered using a decoding procedure. For security, the adversary then receives the codeword as well as the message, tries to compress the codeword into a small storage s. Then the adversary, given s and the message, tries to recover the exact codeword c.

A rate-1 incompressible signature (with small public keys) gives an incompressible encoding: to encode a message, simply generate a new public/secret key pair, and sign the message. The codeword c is then the public key together with the signature. Decoding and security follow readily from the message extraction procedure and security of the incompressible signature.

In the other direction, to sign a message, first incompressibly encode the message and then sign the result using a standard-model signature scheme. The final signature is the codeword together with the standard-model signature. Extraction follows from the decoding procedure. If the incompressible encoding supports low-space streaming, so does the signature scheme. For security, since the adversary cannot produce the original codeword that was signed due to the security of the incompressible encoding, they must produce some other codeword. But a valid signature would also contain a standard-model signature on this new codeword, violating the security of the signature scheme.

Other known work instantiates incompressible encodings under either the Decisional Composite Residuosity (DCR) or Learning With Errors (LWE) assumptions, in either the CRS or random oracle models. We observe that their incompressible encodings simply break the message into blocks of length poly($\lambda$) and encode each block separately; as such they can be easily streamed in low space, though the CRS-based scheme would need the CRS to be streamed as well. We obtain the incompressible signatures under the same assumptions in the same models, with low-space streaming.

We also note that we can have the signer generate the CRS and include it in the public key, giving a standard-model incompressible encoding scheme with large public keys. Note that such a scheme is not immediately equivalent to incompressible encodings, since the codeword contains the public key, and would therefore be too large.

Other work shows that a CRS or random oracle is somewhat necessary, by giving a black box separation relative to falsifiable assumptions in the standard model. This implies such a black box impossibility for incompressible signatures in the standard model as well.

Min-Entropy Extractor. Recall the definition for average min-entropy:

Definition 1 (Average Min-Entropy). For two jointly distributed random variables (X, Y), the average min-entropy of X conditioned on Y is defined as $$H_\infty(X \mid Y) = -\log E_{y \leftarrow Y} \left[ \max_x Pr[X = x \mid Y = y] \right].$$

Lemma 1. For random variables X, Y where Y is supported over a set of size T, we have $H_\infty(X|Y) \geq H_\infty(X, Y) - \log T \geq H_\infty(X) - \log T$.

Definition 2 (Extractor). A function Extract: $\{0, 1\}^n \times \{0, 1\}^d \to \{0, 1\}^m$ is a (k, $\epsilon$) strong average min-entropy extractor if, for all jointly distributed random variables (X, Y) where X takes values in $\{0, 1\}^n$ and $H_\infty(X|Y) \geq k$, we have that $(U_d, \text{Extract}(X; U_d), Y)$ is $\epsilon$-close to $(s, U_m, Y)$, where $U_d$ and $U_m$ are uniformly random strings of length d and m respectively.

Any strong randomness extractor is also a strong average min-entropy extractor, with a constant loss in $\epsilon$.

Digital Signatures. We also generalize the syntax of a signature scheme, which will ultimately be necessary to achieve a meaningful high "rate". Instead of producing a signature that is sent along side the message, we would implicitly embed or encode the message into the signature. The signature is then all that is sent to the receiver, from which the message can be decoded and verified. Any standard signature scheme can readily be viewed in a generalized syntax by just calling (m, $\sigma$) the "signature."

A public key signature scheme for message space $\{0, 1\}^{L_m}$ and signature space $\{0, 1\}^{L_\sigma}$ is a tuple of PPT algorithms $\Pi$=(Gen, Sign, Ver) such that:

Gen($1^\lambda$)→(vk, sk) samples a verification key vk, and a signing key sk.

Sign(sk, m)→$\sigma$ takes as input the signing key sk and a message m, and computes a signature $\sigma$ that implicitly contains the message m.

Ver(vk, $\sigma$)→m/$\perp$ takes as input the verification key vk and a signature $\sigma$, and outputs either the message m or $\perp$. Outputting m means that the signature verifies, and outputting $\perp$ means that the signature is invalid.

Definition 3 (Correctness). For all $\lambda \in \mathbb{N}$ and message m$\in \{0, 1\}^{L_m}$, let (vk, sk)←Gen($1^\lambda$), then we have Pr[Ver(vk, Sign(sk, m))=m]$\geq 1-\text{negl}(\lambda)$.

We modify the security experiment slightly by asking the adversary to output a signature a instead of a message-signature pair, and the adversary wins the game if and only if Ver(vk, $\sigma$)$\notin \{\perp, m_1, \ldots, m_q\}$ where $m_i$'s are the previously queried messages. The "rate" of the signature scheme is defined to be $L_m/L_\sigma$.

Functional Encryption. The disclosed constructions also need singe-key game-based functional encryption. Let $\lambda$ be the security parameter. Let $\{C_\lambda\}$ be a class of circuits with input space $\mathcal{X}_\lambda$ and output space $\mathcal{Y}_\lambda$. A functional encryption scheme for the circuit class $\{C_\lambda\}$ is a tuple of PPT algorithms FE=(Setup, KeyGen, Enc, Dec) defined as follows:

Setup($1^\lambda$)→(mpk, msk) takes as input the security parameter $\lambda$, and outputs the master public key mpk and the master secret key msk.

KeyGen(msk, C)→$sk_C$ takes as input the master secret key msk and a circuit C∈{$\mathcal{C}_\lambda$}, and outputs a function key $sk_C$.

Enc(mpk, m)→ct takes as input the public key mpk and a message m∈$\mathcal{X}_\lambda$, and outputs the ciphertext ct.

Dec($sk_C$, ct)→y takes as input a function key $sk_C$ and a ciphertext ct, and outputs a value y∈$\mathcal{Y}_\lambda$.

We can analogously define the "rate" of an FE scheme to be the ratio between the message length to the ciphertext length. We require correctness and security of a functional encryption scheme.

Definition 4 (Correctness). A functional encryption scheme FE=(Setup, KeyGen, Enc, Dec) is said to be correct if for all C∈{$\mathcal{C}_\lambda$} and m∈$\mathcal{X}_\lambda$:

$$Pr\left[y = C(m): \begin{array}{l}(mpk, msk) \leftarrow \text{Setup}(1^\lambda) \\ sk_C \leftarrow \text{KeyGen}(msk, C) \\ ct \leftarrow \text{Enc}(mpk, m) \\ y \leftarrow \text{Dec}(sk_C, ct)\end{array}\right] \geq 1 - negl(\lambda).$$

Consider the following Semi-Adaptive Security Experiment, $\text{Dist}_{FE,\mathcal{A}}^{SemiAdpt}(\lambda)$:

Run FE.Setup($1^\lambda$) to obtain (mpk, msk) and sample a random bit b←{0, 1}.

On input $1^\lambda$ and mpk, The adversary $\mathcal{A}$ submits the challenge query consisting of two messages $m_0$ and $m_1$. It then receives ct←FE.Enc(mpk, $m_b$).

The adversary now submits a circuit C∈{$\mathcal{C}_\lambda$} s.t. C($m_0$)=C($m_1$), and receives $sk_C$←FE.KeyGen(msk, C).

The adversary $\mathcal{A}$ outputs a guess b' for b. If b'=b, we say that the adversary succeeds and experiment outputs 1. Otherwise, the experiment outputs 0.

Definition 5 (Single-Key Semi-Adaptive Security). For security parameter $\lambda$, a functional encryption scheme FE=(Setup, KeyGen, Enc, Dec) is said to have single-key semi-adaptive security if for all PPT adversaries $\mathcal{A}$:

$$Pr\left[\text{Dist}_{FE,\mathcal{A}}^{SemiAdpt}(\lambda) = 1\right] \leq \frac{1}{2} + negl(\lambda).$$

We can also consider selective security, where the adversary only receives mpk after sending the challenge messages. We can also consider many-time semi-adaptive/selective security, where the adversary is able to adaptively query for as many $sk_C$ as it would like, provided they all occur after the challenge query.

Incompressible Encryption

Here we show how to construct an incompressible public key encryption scheme with low "rate", i.e. the ratio of the message size to the ciphertext size. First, we define what it means for a public key encryption scheme to be incompressible.

Definition

We give the definition of incompressible encryption, which is based on a similar definition of disappearing encryption. For security parameters $\lambda$ and S, an incompressible public key encryption scheme with message space {0, $1\}^{L_m}$ and ciphertext space {0, $1\}^{L_{ct}}$, is a tuple of PPT algorithms Π=(Gen, Enc, Dec).

For the original disappearing PKE, it is additionally required that Gen, Enc, and Dec can be run in space N«$L_{ct}$. Here, we will consider schemes that have both large and small space.

The rest of the syntax of an incompressible PKE scheme is identical to that of a classical PKE scheme. The "rate" of the PKE scheme is simply $L_m/L_{ct}$.

For the security definition, consider the following indistinguishability experiment for an adversary $\mathcal{A}$=($\mathcal{A}_1$, $\mathcal{A}_2$): Incompressible Encryption Security Experiment $\text{Dist}_{\mathcal{A},\Pi}^{IncomEnc}(\lambda)$:

1. The adversary $\mathcal{A}_1$, on input $1^\lambda$, outputs a space bound $1^S$.
2. Run Gen($1^\lambda$, $1^S$) to obtain keys (pk, sk).
3. Sample a uniform bit b∈{0, 1}.
4. The adversary is then provided the public key pk and submits an auxiliary input aux.
5. The adversary replies with the challenge query consisting of two messages $m_0$ and $m_1$, receives ct←Enc (pk, $m_b$).
6. $\mathcal{A}_1$ produces a state st of size at most S.
7. The adversary $\mathcal{A}_2$ is given the tuple (pk, sk, aux, st) and outputs a guess b' for b. If b'=b, we say that the adversary succeeds and the output of the experiment is 1. Otherwise, the experiment outputs 0.

Definition 6 (Incompressible Encryption Security). For security parameters $\lambda$ and S, a public key encryption scheme Π=(Gen, Enc, Dec) has incompressible encryption security if for all PPT adversaries $\mathcal{A}$=($\mathcal{A}_1$, $\mathcal{A}_2$):

$$Pr\left[\text{Dist}_{\mathcal{A},\Pi}^{IncomEnc}(\lambda) = 1\right] \leq \frac{1}{2} + negl(\lambda).$$

Notice that allowing the adversary to submit and later receive the auxiliary input aux is equivalent to allowing $\mathcal{A}_1$, $\mathcal{A}_2$ to just have shared randomness at the beginning of the experiment and that, in the non-uniform setting, the definition would be the same without aux since $\mathcal{A}_1$, $\mathcal{A}_2$ are deterministic w.l.o.g.

The original Disappearing Ciphertext Security has a very similar security notion, except that the adversary has a space bound of S throughout the entire experiment, and that the ciphertext is a long stream sent bit by bit. Notice that the disclosed definition of Incompressible Encryption Security is a strictly stronger security definition than Disappearing Ciphertext Security.

Construction

Construction 1. Given FE=(Setup, KeyGen, Enc, Dec) a single-key selectively secure functional encryption scheme with a rate of $\rho_{FE}$ and a strong average min-entropy extractor Extract: {0, $1\}^n$×{0, $1\}^d$→{0, $1\}^{L_m}$, with d=poly($\lambda$) and n=S+poly($\lambda$) the construction Π=(Gen, Enc, Dec) works as follows:

Gen($1^\lambda$, $1^S$): First, obtain (FE.mpk, FE.msk)←FE.Setup ($1^\lambda$). Then, generate the secret key for the following function $f_v$ with a hardcoded v∈{0, $1\}^{d+L_m}$:

$$f_v(s' = (s, t), \text{flag}) = \begin{cases} s' & \text{if flag} = 0 \\ s' \oplus v & \text{if flag} = 1 \end{cases}.$$

Output pk=FE.mpk and sk=FE.$sk_{f_v}$←FE.KeyGen (FE.msk, $f_v$).

Enc(pk, m): Sample a random tuple s'=(s, t) where s∈{0, $1\}^d$ is used as a seed for the extractor and t∈{0, $1\}^{L_m}$ is used as a one-time pad. The ciphertext consists of three parts: FE.ct←FE.Enc(FE.mpk, (s', 0)), a long randomness R∈{0, 1}$^n$, and z=Extract(R; s)⊕t⊕m.

Dec(sk, ct=(FE.ct, R, z)): First, obtain s'←FE.Dec (FE.sk$_{f_v}$, FE.ct), and then use the seed s to compute Extract(R; s)⊕z⊕t to recover m.

Note that if Extract is an online extractor, then encryption and decryption can be run in a low-space streaming fashion, by first sending FE.ct, then streaming R, and then sending z. The rate of this construction is $$\frac{L_m}{L_{ct}} = L_m \left( \frac{d + L_m + 1}{\rho_{FE}} + n + L_m \right)^{-1} = \frac{1}{(1/\rho_{FE} + 1) + S/L_m} - o(1).$$

Theorem 1. Assuming the existence of a functional encryption scheme with single-key selective security and a rate of 1/poly($\lambda$), and a (poly($\lambda$), negl($\lambda$)) average min-entropy extractor, there exists an incompressible PKE with ciphertext size S+L$_m$+poly($\lambda$)+poly($\lambda$)L$_m$, public key size poly($\lambda$) and secret key size poly($\lambda$). It supports streaming decryption using L$_m$+poly($\lambda$) bits of memory.

Instantiating Functional Encryption

Disclosed herein is a construction of functional encryption for the needed functionality. Recall that the functions $f_v$ have the form $f_v$(s, flag)=s⊕(flag·v).

Construction 2. Let (Gen', Enc', Dec') be a public key encryption scheme. The scheme FE=(Setup, KeyGen, Enc, Dec) for message length n+1 is defined as:

Setup(1$^\lambda$): For i∈{1, . . . , n}, b∈{0, 1}, run (pk$_{i,b}$, sk$_{i,b}$)←Gen'(1$^\lambda$). Output (mpk=(pk$_{i,b}$)$_{i,b}$, msk=(sk$_{i,b}$)$_{i,b}$).

KeyGen(msk, $f_v$)=(sk$_{i,v_i}$)$_i$.

Enc(mpk, (s, flag)): For i∈{1, . . . , n}, b∈{0, 1}, compute c$_{i,b}$=Enc'(pk$_{i,b}$, s$_i$⊕(flag·b)). Output c=(c$_{i,b}$)$_{i,b}$.

Dec(sk$_{f_v}$, c): Output x=x$_1$x$_2$ . . . x$_n$ where x$_i$=Dec'(sk$_{i,v_i}$, c$_{i,v_i}$)

For correctness, note that x$_i$=s$_i$⊕(flag·v$_i$), and therefore x=s⊕(flag·v)=$f_v$(s, flag). Note that the rate of this scheme is 1/poly($\lambda$). Thus the overall rate of the incompressible encryption scheme is 1/poly($\lambda$).

Theorem 2. If (Gen', Enc', Dec') is a CPA secure public key encryption scheme, then Construction 2 is single key semi-adaptively secure for the functions $f_v$.

Corollary 1. Assuming the existence of a CPA secure public key encryption scheme and a (poly($\lambda$), negl($\lambda$)) average min-entropy extractor, there exists an incompressible PKE with ciphertext size S+L$_m$+poly($\lambda$)+poly($\lambda$)L$_m$, public key size poly($\lambda$) and secret key size poly($\lambda$). Furthermore, it supports streaming decryption using L$_m$+poly($\lambda$) bits of memory.

Rate-1 Incompressible Encryption

Here, we construct incompressible encryption with an optimal rate of 1−o(1), i.e. the message length is (almost) the same as the ciphertext length.

Construction

For the disclosed construction, it requires a functional encryption scheme with single-key semi-adaptive security and a rate of 1, a strong average min-entropy extractor, and a secure pseudorandom generator (PRG). The disclosed construction works as follows.

Construction 3. Given FE=(Setup, KeyGen, Enc, Dec) a rate-1 functional encryption scheme satisfying single-key semi-adaptive security, Extract: $\{0, 1\}^{L_m} \times \{0, 1\}^d \to \{0, 1\}^n$ a strong average min-entropy extractor where d, n=poly($\lambda$), and PRG: $\{0, 1\}^n \to \{0, 1\}^{L_m}$ a secure PRG, the construction Π=(Gen, Enc, Dec) works as follows:

Gen(1$^\lambda$, 1$^S$): First, obtain (FE.mpk, FE.msk)←FE.Setup (1$^\lambda$). Then, generate the secret key for the following function $f_{v,s}$ with a hardcoded large random pad v∈{0, 1}$^{L_m}$ and a small extractor seed s∈{0, 1}$^d$:

$$f_{v,s}(x, \text{flag}) = \begin{cases} x & \text{if flag} = 0 \\ PRG(\text{Extract}(x; s)) \oplus v & \text{if flag} = 1 \end{cases}.$$

Output pk=FE.mpk and sk=FE.sk$_{f_{v,s}}$←FE.KeyGen (FE.msk, $f_{v,s}$). Set L$_m$=S+poly($\lambda$).

Enc(pk, m): The ciphertext is simply an encryption of (m, 0) using the underlying FE scheme, i.e. FE.ct←FE.Enc (FE.mpk, (m, 0)).

Dec(sk, ct): Decryption also corresponds to FE decryption. The output is simply FE.Dec(FE.sk$_{f_{v,s}}$, ct)=$f_{v,s}$(m, 0)=m as desired.

Let $\rho_{FE}$ be the rate of FE. Then the ciphertext size is (L$_m$+1)/$\rho_{FE}$ and the rate of the incompressible encryption scheme is $\rho_\Pi = \rho_{FE}/(1+L_m^{-1})$. If $\rho_{FE}$=1−o(1), then $\rho_\Pi$=1−o (1) as well.

Theorem 3. Assuming the existence of a functional encryption scheme with single-key semi-adaptive security and a rate of 1−o(1), and a (poly($\lambda$), negl($\lambda$)) average min-entropy extractor, there exists an incompressible PKE with message size of up to S−poly($\lambda$), ciphertext size S+poly($\lambda$), public key size poly($\lambda$) and secret key size poly(S, $\lambda$).

Incompressible Signatures

Definition

Herein is presented the definition of incompressible signatures. An incompressible signature scheme Π=(Gen, Sign, Ver) takes an additional space parameter S, and in addition to the standard model signature security (where the adversary has unbounded space throughout the game), we also require incompressible signature security that utilizes the following experiment for adversary $\mathcal{A}$=($\mathcal{A}_1$, $\mathcal{A}_2$):

Signature Forgery Experiment SigForge$\mathcal{A}_{,\Pi}^{IncomSig}$($\lambda$):

The adversary $\mathcal{A}_1$, on input 1$^\lambda$, outputs a space bound 1$^S$.

Run Gen(1$^\lambda$, 1$^S$) to obtain keys (vk, sk).

The adversary $\mathcal{A}_1$ is given the public key vk, and submits an auxiliary input aux.

For q=poly($\lambda$) rounds, $\mathcal{A}_1$ submits a message m, and receives σ←Sign(sk, m). At the end of the last round, $\mathcal{A}_1$ produces a state st of size at most S.

The adversary $\mathcal{A}_2$ is given the public key vk, the state st, and the auxiliary input aux, and outputs a signature σ'. If Ver(vk, σ') outputs ⊥, output 0. Otherwise, output 1.

Notice that traditionally, we would require Ver(vk, σ') to be distinct from the messages m's queried before, but here we have no such requirement. Also, notice that allowing the adversary to submit and later receive the auxiliary input aux is equivalent to allowing $\mathcal{A}_1$, $\mathcal{A}_2$ to just have shared randomness at the beginning of the experiment and that, in the non-uniform setting, the definition would be the same without aux since $\mathcal{A}_1$, $\mathcal{A}_2$ are deterministic w.l.o.g. With this experiment in mind, we now define the additional security requirement for an incompressible signature scheme.

Definition 7 (Incompressible Signature Security). For security parameters $\lambda$ and S, an incompressible signature scheme Π=(Gen, Sig, Ver) has incompressible signature security, if for all PPT adversaries $\mathcal{A} = (\mathcal{A}_1, \mathcal{A}_2)$:

$$Pr\left[SigForge_{\mathcal{A},\Pi}^{IncomSig}(\lambda) = 1\right] \leq negl(\lambda).$$

Construction

A construction from classical public key signature schemes is disclosed.

Construction 4. Let $\lambda$, S be security parameters. Given Sig=(Gen, Sign, Ver) a classical public key signature scheme with message space $\{0, 1\}^{n+L_m}$ where n=S+poly($\lambda$) and rate $\rho'$, we construct an incompressible signature scheme Π=(Gen, Sign, Ver) as follows:

Gen($1^\lambda$, $1^S$): Run Sig.Gen($1^\lambda$) to obtain (Sig.vk, Sig.sk). Output vk=Sig.vk and sk=Sig.sk.

Sign(sk, m): Sample randomness R∈ $\{0, 1\}^n$, and output σ←Sig.Sign(Sig.sk, (R, m)).

Ver(vk, σ): Run M←Sig.Ver(Sig.vk, σ). If M=⊥, output ⊥. Otherwise, if M=(R, m), output m.

Sig can be computed in an low-space streaming fashion, since we can hash the message in low space first using Merkle-Damgård. Then Construction 5 can readily be computed with low space streaming. The rate of this construction is $$\frac{L_m}{L_\sigma} = \frac{L_m}{(S+L_m)/\rho'} = \rho'(1+S/L_m)^{-1}.$$

Rate-1 Incompressible Signatures

Incompressible Encoding

Prior work gives the definition for incompressible encodings and shows construction based on either the Decisional Composite Residuosity (DCR) or Learning With Errors (LWE) assumptions, in either the random oracle model or the CRS model. We modify the definition slightly to better accommodate the syntax, as described herein.

Definition 8 (Incompressible Encodings). Let $\lambda$ be security parameters. An incompressible encoding scheme for message space $\{0, 1\}^{L_m}$ and codeword space $\{0, 1\}^{L_c}$ is a pair of PPT algorithms Code=(Enc, Dec) that utilizes the following syntax:

Enc($1^\lambda$, m)←c on input the security parameter and a message, outputs a codeword c.

Dec(c)←m on input a codeword, outputs the decoded message m.

The "rate" of the incompressible encoding is $L_m/L_c$. This is equivalent to the $\alpha$-expansion property for $\alpha=L_c/L_m$.

We additionally require correctness and S-incompressibility, which is equivalent to $\beta$-incompressibility for $\beta=S$:

Definition 9 (Correctness). For all $\lambda \in \mathbb{N}$ and $m \in \mathcal{M}$, $Pr[Dec(Enc(1^\lambda, m))=m] \geq 1-negl(\lambda)$.

Next, consider the following experiment for adversary $\mathcal{A} = (\mathcal{A}_1, \mathcal{A}_2)$:

Codeword Compression Experiment $Comp_{\mathcal{A},Code}^{IncomCode}(\lambda, S)$:

On input $1^\lambda$, the adversary $\mathcal{A}_1$ submits a message m and auxiliary input aux. It receives c←Enc($1^\lambda$, m), and produces a state st of size at most S.

The adversary $\mathcal{A}_2$ is given the state st, the message m, and the auxiliary information aux; it produces a codeword c'. Output 1 if and only if c'=c.

Definition 10 (S-Incompressibility). For security parameter $\lambda$, we require that for all PPT adversary $\mathcal{A} = (\mathcal{A}_1, \mathcal{A}_2)$:

$$Pr\left[Comp_{\mathcal{A},Code}^{IncomCode}(\lambda, S) = 1\right] \leq negl(\lambda).$$

Construction

Now we show how we modify Construction 4 to get an incompressible signature scheme with a rate of 1. The procedure of attaching a long random string in Construction 4 can be considered as a form of an incompressible encoding with a poor rate. Here we just need to replace it with an incompressible encoding with a rate of 1.

Construction 5. Let $\lambda$, S be security parameters. Given Sig=(Gen, Sign, Ver) a classical signature scheme with rate 1, and Code=(Enc, Dec) an incompressible encoding scheme with rate 1 and S-incompressibility, we construct an incompressible signature scheme Π=(Gen, Sign, Ver) as follows:

Gen($1^\lambda$, $1^S$): Run Sig.Gen($1^\lambda$) to obtain (Sig.vk, Sig.sk). Output vk=Sig.vk and sk=Sig.sk.

Sign(sk, m): First compute the codeword c←Code.Enc($1^\lambda$, m), and then compute σ←Sig.Sign(Sig.sk, c).

Ver(vk, σ): Run c←Sig.Ver(Sig.vk, σ). If c=⊥, output ⊥. Otherwise, output m←Code.Dec(c).

The rate of the scheme is the product of the rates of the incompressible encoding and standard-model signature scheme. We can construct a classical signature scheme with rate 1−o(1) from any one-way function by hashing the message using a universal one-way hash function, and then signing the hash value. The incompressible signatures therefore have rate 1−o(1), in the CRS or random oracle model.

Theorem 4. Assuming the existence of a secure public key signature scheme with rate 1−o(1) and an incompressible encoding scheme [in the CRS/RO model] with rate 1−o(1), there exists an incompressible signature scheme [in the CRS/RO model] with rate 1−o(1), public key size poly($\lambda$) and secret key size poly($\lambda$). Furthermore, it supports streaming computation using poly($\lambda$) bits of memory, assuming that the incompressible encoding scheme does as well [either in the random oracle model, or with the streaming of the CRS in the CRS model]. If the incompressible encoding scheme in the CRS model is only selectively secure, then so is the resulting incompressible signature scheme.

Equivalence to Incompressible Encoding

We disclose that incompressible signatures are equivalent to incompressible encodings (plus one-way functions) by showing how to construct an incompressible encoding scheme from an incompressible signature scheme.

Construction 6. Let $\lambda$ be a security parameter. Given Sig=(Gen, Sign, Ver) an incompressible signature scheme with rate 1 and small verification keys, we construct an incompressible encoding scheme Π=(Enc, Dec, Ver) as follows:

Enc($1^\lambda$, m): Sample (Sig.vk, Sig.sk)←Sig.Gen($1^\lambda$, $1^S$), and then compute σ←Sig.Sign(Sig.sk, m). Output c=(Sig.vk, σ).

Dec(c=(Sig.vk, σ)): Simply output m←Sig.Ver(Sig.vk, σ).

The codeword length is the signature length (equal to message length if Sig has rate 1) plus the length of the verification length. Hence the rate is 1 if the verification keys are short. Correctness follows directly from the correctness of the signature scheme. Security also follows directly: if an adversary using a state st of size at most S is able to produce c'=c, then it has also produced a valid signature a and hence wins the incompressible signature security game. Therefore, by Construction 5 and 6, incompressible signatures and incompressible encodings (plus one-way functions) are equivalent.

Constructing Rate-1 Functional Encryption

Here, we build rate-1 functional encryption (FE). For the disclosed application, we only need one key security. However, the disclosed construction satisfies many-key security, though we need indistinguishability obfuscation (iO).

The disclosed construction expands upon known techniques which build from iO a private linear broadcast encryption, which is a special case of general FE. A number of issues arise in generalizing their construction to general functions, which we demonstrate how to handle.

Building Blocks

Definition 11 (Indistinguishability Obfuscation). An indistinguiability obfuscator $i\mathcal{O}$ for a circuit class $\{\mathcal{C}_\lambda\}$ is a PPT uniform algorithm satisfying the following conditions:

Functionality: For any $C \in \mathcal{C}_\lambda$, then with probability 1 over the choice of $C' \leftarrow i\mathcal{O}(1^\lambda, C)$, $C'(x) = C(x)$ for all inputs x.

Security: For all pairs of PPT adversaries (S, D), if there exists a negligible function $\alpha$ such that $$Pr[\forall x, C_0(x) = C_1(x): (C_0, C_1, \sigma) \leftarrow S(\lambda)] > 1 - \alpha(\lambda)$$

then there exists a negligible function $\beta$ such that $$|Pr[D(\sigma, iO(\lambda, C_0)) = 1] - Pr[D(\sigma, iO(\lambda, C_1)) = 1]| < \beta(\lambda)$$

When $\mathcal{C}_\lambda$ is the class of all polynomial-size circuits, we simply call $i\mathcal{O}$ an indistinguishability obfuscator. There are several known ways to construct indistinguishability obfuscation:

Build the first candidate obfuscation from cryptographic multilinear maps.

Provably from novel strong circularity assumptions

Provably from "standard" assumptions: (sub-exponentially secure) LWE, LPN over fields, bilinear maps, and constant-locality PRGs Definition 12 (Puncturable PRF). A puncturable PRF with domain $\mathcal{X}_\lambda$ and range $\mathcal{Y}_\lambda$ is a pair (Gen, Punc) where:

Gen($1^\lambda$) outputs an efficiently computable function PRF: $\mathcal{X}_\lambda \to \mathcal{Y}_\lambda$ Punc(PRF, x) takes as input a function PRF and an input $x \in \mathcal{X}_\lambda$, and outputs a "punctured" function $PRF^{\bar{x}}$.

Correctness: With probability 1 over the choice of PRF $\leftarrow$ Gen($1^\lambda$), $$PRF^{\bar{x}}(x') = \begin{cases} PRF(x') & \text{if } x' \neq x \\ \perp & \text{if } x' = x \end{cases}$$

Security: For all $x \in \mathcal{X}_\lambda$, $(PRF^{\bar{x}}, PRF(x))$ is computationally indistinguishable from $(PRF^{\bar{x}}, y)$, where PRF $\leftarrow$ Gen($1^\lambda$) and $y \leftarrow \mathcal{Y}_\lambda$.

Such puncturable PRFs can be built from any one-way function.

Disclosed herein is a definition of a type of signature scheme with a single-point binding (SPB) property. This allows, given a message m, for generating a fake verification key together with a signature on m. The fake verification key and signature should be indistinguishable from the honest case. Yet there are no signatures on messages other than m relative to the fake verification key. Prior work implicitly constructs such signatures from iO and one-way functions, but with a logarithmic message space, which was good enough for their special-purpose FE scheme. In this case, we need to handle very large exponential message spaces. The problem with the prior work approach is that the security loss is proportional to the message space; to compensate requires assuming (sub)exponential hardness, and also setting the security parameter to be larger than the message length. This results in the signature size being polynomial in the message size, resulting in a low-rate FE scheme. SPB signatures avoid the exponential loss, so we can keep the security parameter small, resulting in a rate-1 FE scheme.

Definition 13. A single-point binding (SPB) signature is a quadruple of algorithms (Gen, Sign, Ver, GenBind) where Gen, Sign, Ver satisfy the usual properties of a signature scheme. Additionally, we have the following:

(vk, $\sigma$) $\leftarrow$ GenBind($1^\lambda$, m) takes as input a message m, and produces a verification key vk and signature $\sigma$.

For any messages m and with overwhelming probability over the choice of (vk, $\sigma$) $\leftarrow$ GenBind($1^\lambda$, m), Ver(vk, $\sigma'$) $\in \{m, \perp\}$ for any $\sigma'$. That is, there is no message m'$\neq$m such that there is a valid signature of m' relative to vk.

For any m, GenBind($1^\lambda$, m) and (vk, Sign(sk, m)) are indistinguishable, where (vk, sk) $\leftarrow$ Gen($1^\lambda$). Note that this property implies that Ver(vk, $\sigma$) accepts and output m, when (vk, $\sigma$) $\leftarrow$ GenBind($1^\lambda$, m).

SPB signatures can be constructed either from leveled FHE (and hence LWE), or from iO and one-way functions.

Rate-1 FE Scheme. The rate-1 FE scheme can be:

Construction 7. Let $i\mathcal{O}$ be an indistinguishability obfuscator, Gen be a PRF, (Gen', Sig, Ver) a signature scheme, and PRG: $\{0,1\}^\lambda \to \{0,1\}^{2\lambda}$, PRG': $\{0,1\}^\lambda \to \{0,1\}^{L_m}$ be a PRG.

Setup($1^\lambda$): Sample PRF$\leftarrow$Gen($1^\lambda$). Set msk=PRF and mpk=$i\mathcal{O}(1^\lambda, P_{Enc})$, where $P_{Enc}$ is the program given herein.

KeyGen(msk, f): output $sk_f \leftarrow i\mathcal{O}(1^\lambda, P_{Dec,f})$, where $P_{Dec,f}$ is the program given herein.

Enc(mpk, m): Choose a random r, and evaluate (t, v)$\leftarrow$mpk(r). Then parse v=(w, u). Set c=PRG'(w)$\oplus$m. Next run (vk, sk)$\leftarrow$Gen'($1^\lambda$; u), using u as the random coins for Gen'. Compute $\sigma\leftarrow$Sign(sk, c). Output (t, $\sigma$).

Dec($sk_f$, (t, $\sigma$))=$sk_f$(t, $\sigma$)

The program $P_{Enc}$.

Inputs: r
Constants: PRF
1.      t $\leftarrow$ PRG(r).
2.      v $\leftarrow$ PRF(t).
3.      Output (t, v).

The program $P_{Dec,f}$.

Inputs: t, $\sigma$
Constants: PRF
1.      (w, u) $\leftarrow$ PRF(t)
2.      (vk, sk) $\leftarrow$ Gen'($1^\lambda$; u).
3.      c $\leftarrow$ Ver(vk, $\sigma$). If c = $\perp$, abort and output $\perp$.
4.      Output f(PRG'(w) $\oplus$ c).

Correctness follows immediately from the correctness of the various components. Notice that the ciphertext size is $L_m$+poly($\lambda$), provided the signature scheme outputs short signatures. Therefore, construction 7 has rate 1−o(1).

Provided the random coins for (Gen', Sign, Ver) are independent of the message length, $P_{Enc}$ has size poly($\lambda$), independent of the message length. If Gen', Sign can be evaluated in a low-space streaming fashion, then so can Enc.

System Implementations

FIG. 1 illustrates an example streaming implementation of the claimed systems and methods. As illustrated, in encryption mode, key material 120 is provided to encryption keystream generator module 105 which generates an encryption stream according to the techniques described herein. This keystream data is combined with plaintext 130 in encryption combination module 140. The output of combination module 140 is a cipher-text. The ciphertext stream can be then provided to decryption combination module 145. Key material 125 is provided to decryption keystream generator 115, which generates a decryption stream. The decryption stream is combined with the ciphertext in decryption combination module 145 to derive the original plaintext 135.

Figure 2:
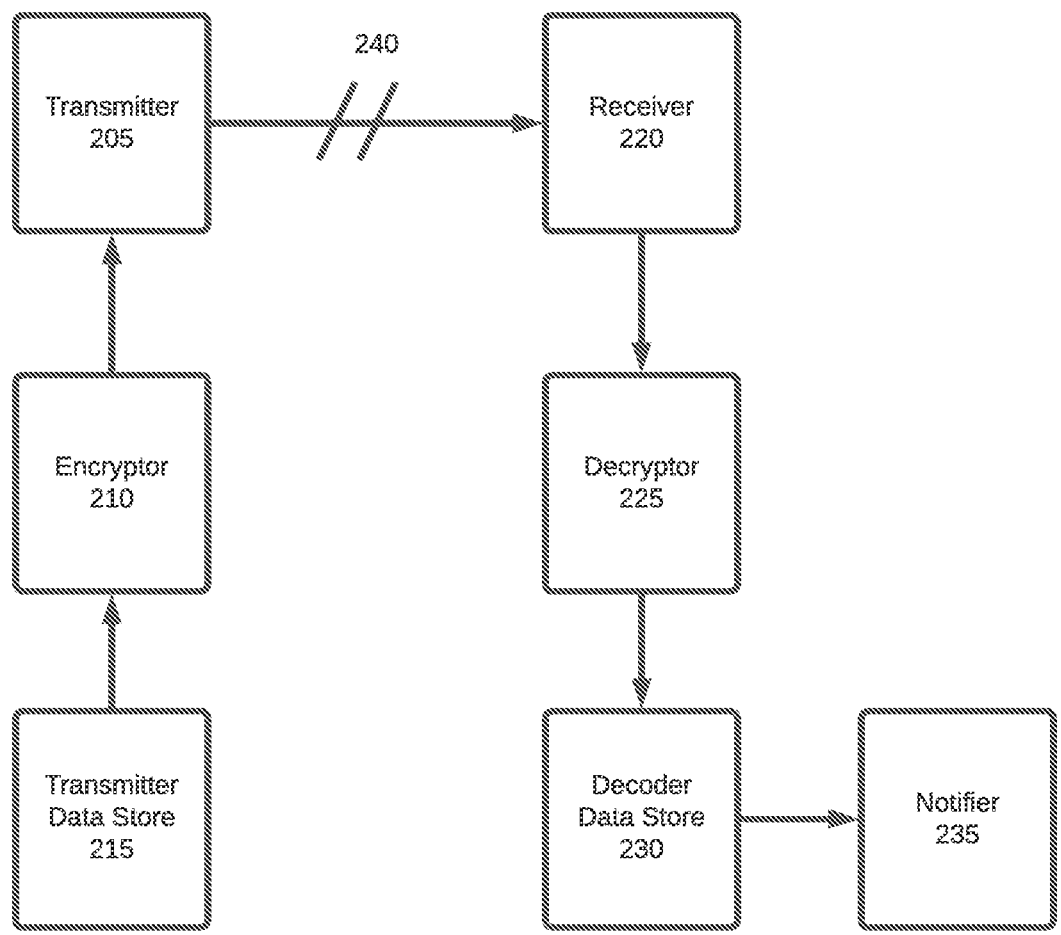
FIG. 2 illustrates an example system for transmitting and receiving an encrypted message over a network.

FIG. 2 illustrates an example system for transmitting and receiving an encrypted message over a network. A system for transmitting a streaming encrypted message is disclosed. Original data, such as messages or other forms of information, can be stored in a transmitter side data store 215. This message is then encoded or encrypted using en-coder 210, according to the data expansion constructions described herein. The encoded message is then transmitted by transmitter 205 over a channel 240 to a receiver 220. After being received at receiver 220, the message is decoded or decrypted using decoder 225 according to the constructions described herein, and stored in the decoder data store 230. The decoder can be configured in such a way that the output of the decoder is limited to be one of the original message (as was stored in transmitter data store 215, a completely unrelated message, or no message at all, such as a failure state. The output of the decoder is then input to notifier 235 which can be configured to provide the output of decoder to an operator, such as an individual or a further system configured to operate on the output.

This subject matter may be implemented as-a-service. As described herein, and without limitation, the subject matter may be implemented within or in association with a cloud deployment platform system or appliance, or using any other type of deployment systems, products, devices, programs or processes. The various modules and related response or notifier system functionality may be provided as a stand-alone function, or it may leverage functionality from other products and services.

A representative cloud application platform with which the technique may be implemented includes, without limitation, any cloud-supported application framework, product or service.

The techniques disclosed herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The tool and response functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes and not meant to limit the scope of the described subject matter.

Figure 3:
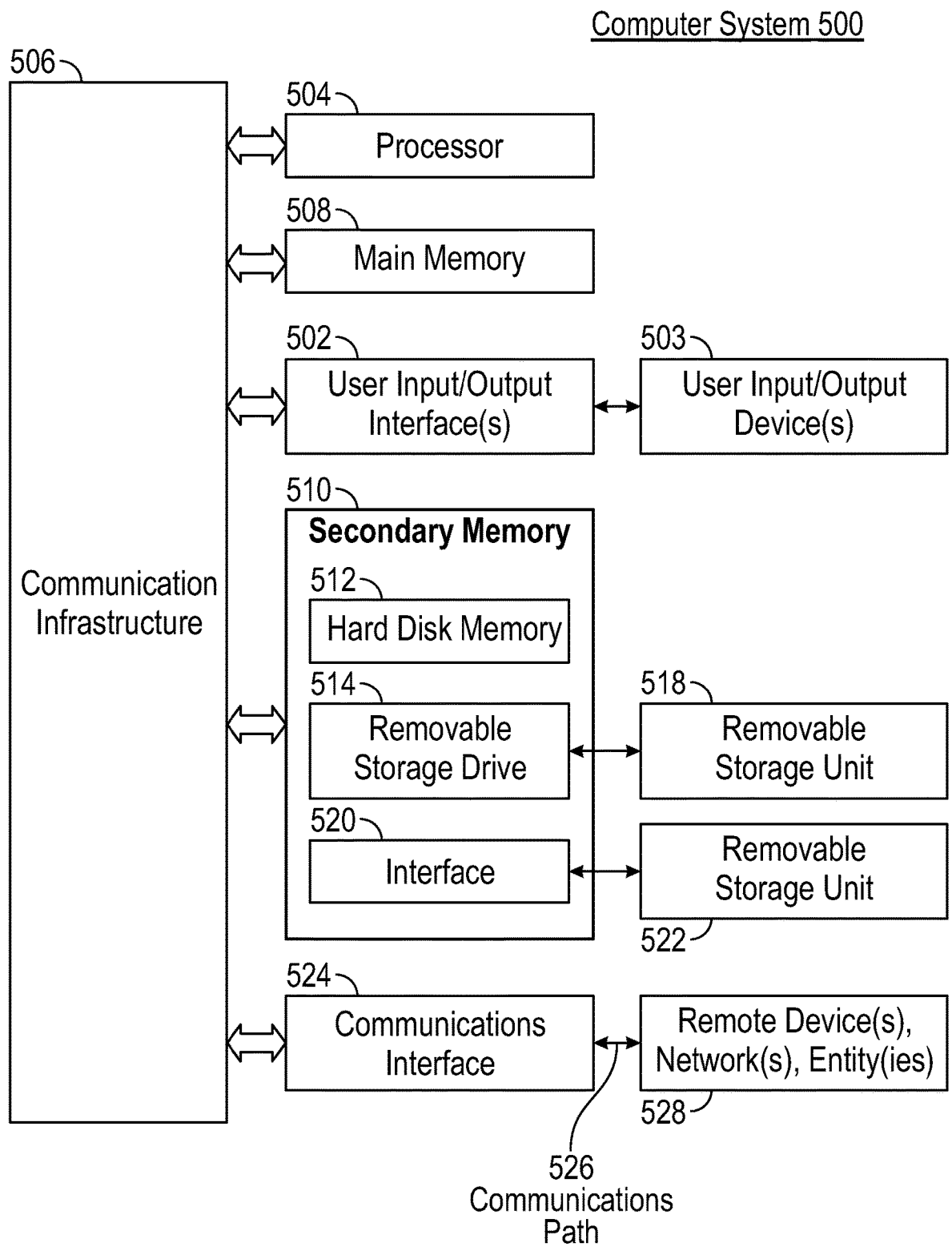
FIG. 3 illustrates an example computer system architecture for implementing the claimed systems and methods.
Figure 4:
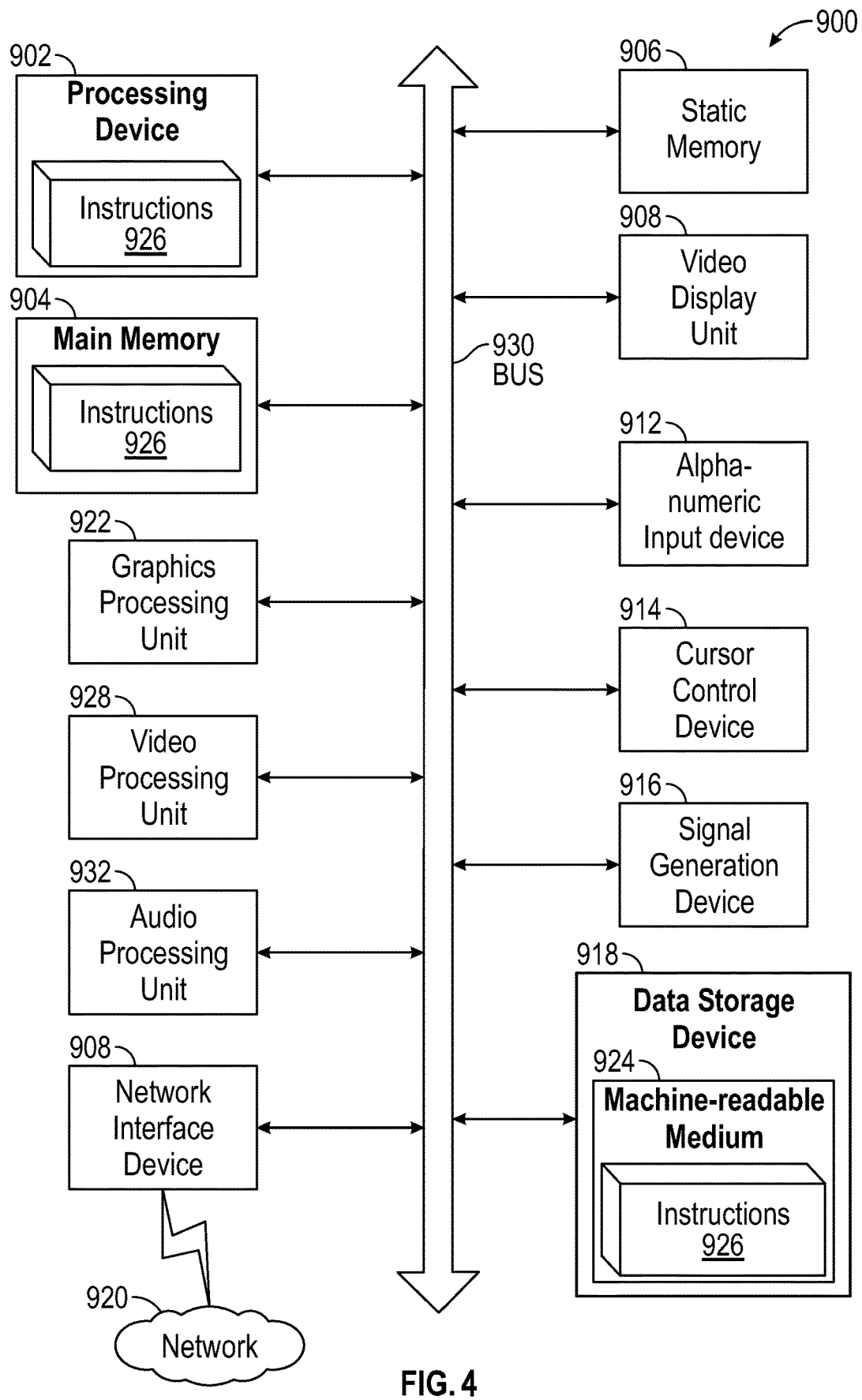
FIG. 4 illustrates further details of an example computer system architecture for implementing the claimed systems and methods.

More generally, computing devices within the context of the disclosed subject matter are each a data processing system (such as shown in FIGS. 3 and 4) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the sensitive data detection service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, data detection security analysis tools and systems, and cloud-based systems, as well as improvements to the functioning of automated sensitive data detection tools and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as mon-itors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the ex-pression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A computerized method for message encryption, the method comprising:
    receiving a message m of arbitrary length and storing the message m on a computerized data store;
    storing a predetermined target ciphertext length;
    executing a setup comprising:
    instantiating a functional encryption scheme to generate a master secret key (msk) and master public key (mpk);
    generating a random variable v;
    defining a function fv based on v;
    deriving a second secret key by executing a key generation algorithm of the functional encryption scheme based on fv and the master secret key, resulting a derived secret key skv;
    encrypting the message m by:
    generating a first random string r having a length based on the predetermined target ciphertext length;
    generating an at least partially random second string u;
    encrypting u under the functional encryption scheme to generate ciphertext c;
    deriving z from r and u and m; and
    outputting z, r and ciphertext c and storing ciphertext c in the computerized data store.

2. The method of claim 1, wherein:
u is based on two random strings and has a last bit set to be 0; and
the derivation of z from r and u and m is performed by:
applying a randomness extractor to r and s, where s is a component of string u; and
xoring the results of the randomness extractor with m and t, where t is a part of string u.

3. The method of claim 2, wherein the extractor is configured to operate in a streaming model, wherein the extractor value r is fed to the extractor in a bitwise streaming fashion.

4. The method of claim 1, wherein the generated first random string has a length that closely approximates but is smaller than the length of the specified target ciphertext length.

5. The method of claim 1, wherein defining a function fv based on v further comprises:
receiving an input string;
based on the last bit of u, if the last bit is 0, then outputting s and t;
if the last bit is 1, then outputting (s and t) x or v.

6. The method of claim 5, wherein the functional encryption scheme is instantiated by:
receiving a message comprising u and a flag comprising the last bit of u;
generating a set of 2*n public-secret key pairs for a public key encryption scheme (pki,b,ski,b) where n is the length of u−1, where b is 0 or 1, and i is in the range of 1 to n;
executing a key generation process, comprising:
for i in the range of 1 to n, generating secret key (ski,w) where w is the ith bit of v;
executing an encryption algorithm, comprising:
for i in the range of 1 to n, and b is 0 or 1, if the flag is 0, then compute the public key encryption cti,b of ith bit of u using pki,b;
if the flag is 1, then compute the public key encryption cti,b of the ith bit of u x or b using pki,b; and
storing the encryptions as the output of the functional encryption scheme.

7. A method for decrypting an encrypted message, the decryption method comprising:
processing a derived secret key skv and a ciphertext c by a functional encryption decryption algorithm to derive a string s';
deriving a plaintext message from s', r and z;
wherein, the plaintext message was previously encrypted by:
generating a first random string r having a length based on a specified target ciphertext length;
generating an at least partially random second string u;
encrypting u under a functional encryption scheme to generate c; and
deriving z from r and u and m; and
outputting z, r, and ciphertext c.

8. The method of claim 7, further comprising executing the decryption method by:
for i in the range of 1 to n, executing a public key decryption on the ciphertext cti,w using the ski,w and storing the output as the plaintext message.

9. The method of claim 7, where deriving plaintext message from s', r and z further comprises:
decomposing s' into s and t; and
applying a randomness extractor to r and s, and xoring the result with t.

10. A computerized system for message encryption, the system comprising a processor configured for:
receiving a message m of arbitrary length and storing the message m on a computerized data store;
storing a predetermined target ciphertext length;
executing a setup comprising:
instantiating a functional encryption scheme to generate a master secret key (msk) and master public key (mpk);
generating a random variable v;
defining a function fv based on v;
deriving a second secret key by executing a key generation algorithm of the functional encryption scheme based on fv and the master secret key, resulting a derived secret key skv;
encrypting the message m by:
generating a first random string r having a length based on the predetermined target ciphertext length;
generating an at least partially random second string u;
encrypting u under the functional encryption scheme to generate ciphertext c;
deriving z from r and u and m; and
outputting z, r and ciphertext c and storing ciphertext c in the computerized data store.

11. The system of claim 10, wherein:
u is based on two random strings and has a last bit set to be 0; and
the derivation of z from r and u and m is performed by:
applying a randomness extractor to r and s, where s is a component of string u; and
xoring the results of the randomness extractor with m and t, where t is a part of string u.

12. The system of claim 11, wherein the extractor is configured to operate in a streaming model, wherein the extractor value r is fed to the extractor in a bitwise streaming fashion.

13. The system of claim 10, wherein the generated first random string has a length that closely approximates but is smaller than the length of the specified target ciphertext length.

14. The system of claim 10, wherein defining a function fv based on v further comprises:
receiving an input string;
based on the last bit of u, if the last bit is 0, then outputting s and t;
if the last bit is 1, then outputting (s and t) x or v.

15. The system of claim 14, wherein the functional encryption scheme is instantiated by:
receiving a message comprising u and a flag comprising the last bit of u;
generating a set of 2*n public-secret key pairs for a public key encryption scheme (pki,b,ski,b) where n is the length of u−1, where b is 0 or 1, and i is in the range of 1 to n;
executing a key generation process, comprising:
for i in the range of 1 to n, generating secret key (ski,w) where w is the ith bit of v;
executing an encryption algorithm, comprising:
for i in the range of 1 to n, and b is 0 or 1, if the flag is 0, then compute the public key encryption cti,b of ith bit of u using pki,b;
if the flag is 1, then compute the public key encryption cti,b of the ith bit of u x or b using pki,b;
storing the encryptions as the output of the functional encryption scheme.

16. A system for decrypting an encrypted message, the decryption method comprising:
processing a derived secret key skv and a ciphertext c by a functional encryption decryption algorithm to derive a string s';
deriving a plaintext message from s', r and z;
wherein, the plaintext message was previously encrypted by:
generating a first random string r having a length based on a specified target ciphertext length;
generating an at least partially random second string u;
encrypting u under a functional encryption scheme to generate c; and
deriving z from r and u and m; and
outputting z, r, and ciphertext c.

17. The system of claim 16, further comprising executing the decryption method by:
for i in the range of 1 to n, executing a public key decryption on the ciphertext cti,w using the ski,w and storing the output as the plaintext message.

18. The system of claim 16, where deriving plaintext message from s', r and z further comprises:
decomposing s' into s and t; and
applying a randomness extractor to r and s, and xoring the result with t.

19. One or more tangible, non-transitory, machine-readable media comprising instructions configured to cause a processor to encrypt a message by:
receiving a message m of arbitrary length and storing the message m on a computerized data store;
storing a predetermined target ciphertext length;
executing a setup comprising:
instantiating a functional encryption scheme to generate a master secret key (msk) and master public key (mpk);
generating a random variable v;
defining a function fv based on v;
deriving a second secret key by executing a key generation algorithm of the functional encryption scheme based on fv and the master secret key, resulting a derived secret key skv;
encrypting the message m by:
generating a first random string r having a length based on the predetermined target ciphertext length;
generating an at least partially random second string u;
encrypting u under the functional encryption scheme to generate ciphertext c;
deriving z from r and u and m; and
outputting z, r and ciphertext c and storing ciphertext c in the computerized data store.

* * * * *